June 4, 1963    F. S. WEISS    3,091,835
CAPACITOR MANUFACTURE
Original Filed April 20, 1956
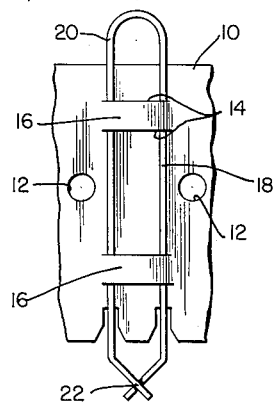
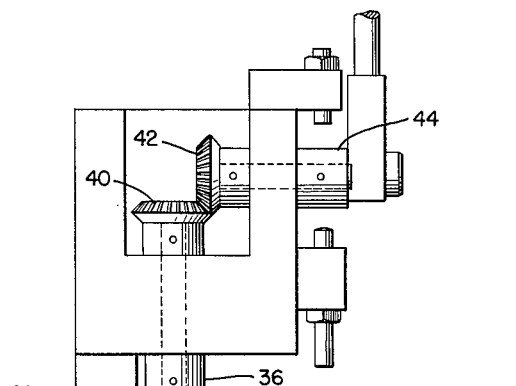
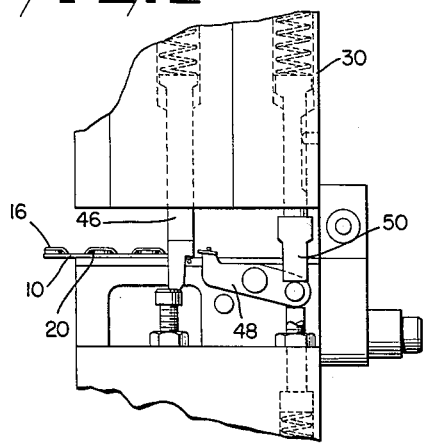
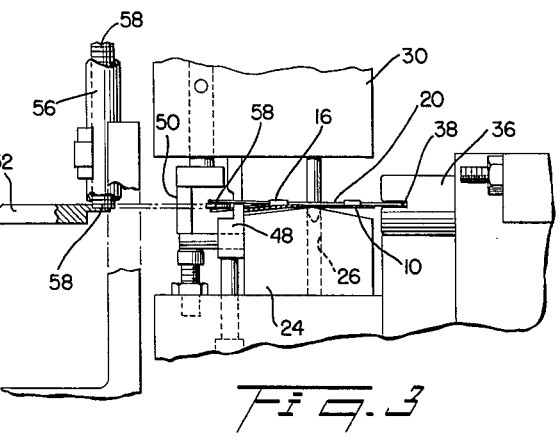
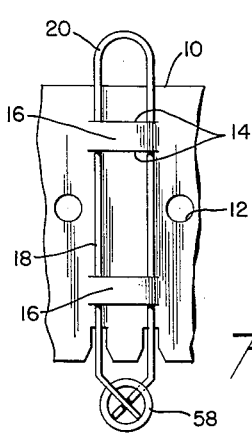
INVENTOR.
FELIX S. WEISS
BY
*Robert E. Isner*
ATTORNEY United States Patent Office 3,091,835
Patented June 4, 1963

3,091,835
CAPACITOR MANUFACTURE
Felix S. Weiss, Chestnut Hill, Mass., assignor to Cornell-Dubilier Electric Corporation, South Plainfield, N.J., a corporation of Delaware
Original application Apr. 20, 1956, Ser. No. 579,679. Divided and this application Mar. 13, 1959, Ser. No. 799,377
7 Claims. (Cl. 29—25.42)

This invention relates to certain improvements in machines for manufacturing capacitors and similar relatively small electrical instrumentalities incorporating a plurality of extending terminal wires, by production line methods in which an effectively endless conveying medium, such as, in the preferred form shown here a dispensable strip of flexible paper-like material, advances the material from which the capacitor or other electrical instrumentality is to be assembled and finally the capacitor or other electrical instrumentality itself to various operating stations at which sequential steps of assembly and eventually final processing and, if desirable, testing of the completed units are performed.

This application is a division of my application Serial No. 579,679, filed April 20, 1956, now abandoned, and is particularly concerned, as will hereinafter more fully be described, with an improved structure for a processing station at which electrode coated ceramic discs are inserted intermediate the predeformed ends of web mounted capacitor terminal subassemblies of the hairpin type and with the provision of a web mounted article subassembly of a particular and commercially advantageous character.

The mechanical improvements and operations which are the subject of this invention are particularly adaptable to the above described general method assembly and production for the principles, purpose and object of increasing the production efficiency and the quality and uniformity of the articles so produced. While its principles may be advantageously used in the production of capacitors and other similar electrical instrumentalities such as resistors and rectifiers in various sizes and shapes and which incorporate a plurality of extending terminal wires and may be applied whether the conveying strip be made of one flexible material or another, the present invention is particularly useful in the production of ceramic disc capacitors which include a relatively small ceramic dielectric disc with a layer of conducting material disposed on the opposite faces thereof and serving as the electrode elements for the capacitor units.

The success of the use of continuous assembly methods of the general type described in the manufacture of these ceramic disc type capacitors depends not only upon the rapidity and continuous flow of operations at the various assembly and processing stations, but also upon the accuracy and reproducibility of those operations at each station, all to the end that each capacitor as it comes to a point of completion, is as much like the preceding and following capacitors as possible. These objectives are materially aided by the provision of an operating station adapted to effect the automatic insertion of electrode coated ceramic discs intermediate the predeformed crossed ends of web mounted terminal wire subassemblies to form web mounted terminal wire subassemblies so constituted as to permit retention of the ceramic discs in the wire subassembly during subsequent web displacement.

The invention may be briefly described as an improved apparatus and mechanism for effecting the automatic insertion of electrode coated ceramic discs intermediate the extending deformed ends of web mounted capacitor terminal subassemblies and includes, in its broader aspects, means for positioning a web mounted capacitor terminal subassembly, means for displacing the extending deformed ends of a terminal wire subassembly into disc receiving position, means for introducing an electrode coated ceramic disc intermediate said extending ends in a position to be engaged thereby and means for displacing the extending ends of the web mounted capacitor subassembly into grasping engagement with the inserted ceramic disc and in its broader aspects to include the provision of a web mounted capacitor subassembly of a particular and advantageous character.

Among the advantages attendant the instant invention is the provision of a web mounted capacitor subassembly so constituted as to permit retention of an electrode coated ceramic disc intermediate the predeformed ends of a web mounted terminal wire subassembly without utilization of additional fastening means during subsequent displacement of the conveying medium. In such web mounted capacitor subassembly the terminal wire subassembly and its mounting on the conveying web integrally cooperate to assure retention of the inserted ceramic disc and to minimize, if not actually preclude, undesired displacement of the capacitor subassembly relative to the conveying medium as might be otherwise occasioned by conveyor medium displacement.

The object of this invention is the provision of improved apparatus for effecting the insertion of electrode coated ceramic discs intermediate the extending ends of web mounted capacitor terminal subassemblies.

Another object of the invention is the provision of a web mounted capacitor subassembly of a particular and advantageous character for continuous assembly methods of production of capacitors and other similar relatively small electrical instrumentalities incorporating a plurality of extending terminal wires.

Other objects and advantages of the invention herein described will be pointed out in the following disclosure and claims and will be illustrated in the accompanying drawings which show, by way of example, the principles underlying the invention and the presently preferred embodiment incorporating those principles, and by which said principles may be usefully employed in the production of ceramic disc capacitors of a high degree of uniformity and with reduced fabrication costs.

Referring to the drawings:
FIGURE 1 is a schematic plan view of a strip conveyor supporting predeformed terminal wire subassemblies which may be conveniently employed in the practice of the herein disclosed invention;
FIGURE 2 is a plan view of the essentials of the presently preferred mechanical elements includable in a ceramic disc insertion processing station in the above mentioned production line method of manufacture;
FIGURE 3 is a side elevational view of the components illustrated in FIGURE 2;
FIGURE 4 is a section taken on line 4—4 of FIGURE 2;
FIGURE 5 is a schematic plan view of a strip conveyor supporting a capacitor subassembly as the same is constituted after operation of the apparatus illustrated in FIGURES 2 through 4.

As indicated above the subject matter of the herein disclosed and claimed invention is of particular utility in the fabrication of ceramic disc type capacitors and other similar relatively small electrical instrumentalities incorporating a plurality of extending terminal wires by continuous assembly production line methods. For the purpose of convenience, the herein specifically disclosed and described embodiment will be one that is particularly adapted for use in conjunction with the fabrication of ceramic disc capacitors by continuous assembly production line methods incorporating a dispensable conveyor strip.

By way of general introduction, FIGURE 1 illustrates a portion of an elongate conveyor strip 10, which may be formed for example, of paperlike material as described in my copending application Serial No. 799,200 filed March 13, 1959. As described therein the web 10 preferably has the properties of flexibility, internal resilience or elastic resistance to deformation and condition impervious mechanical strength. C–3 kraft insulation sheet as manufactured by the Stevens Paper Mills Inc. of Windsor, Conn., in thickness of .010 inch has been found to be suitable for use in the practice of the herein disclosed invention. The conveyor strip 10 is preferably provided with a series of spaced indexing pilot holes 12 which, in addition to defining successive article subassembly receiving areas disposed therebetween, permits careful indexing of the conveyor material in the individual operating stations as well as conveniently providing means by which the web of conveyor material may be advanced during each operational cycle. In addition the strip 10 is provided with a plurality of spaced pairs of transversely aligned slits 14 disposed intermediate successive pilot hole perforations 12, defining article retaining straps 16, which, when raised above the plane of the remainder of the strip, partly define a transversely disposed terminal wire subassembly receiving channel. Disposed within each of the terminal wire subassembly receiving channels is a predeformed terminal wire subassembly disposed in underlying relation to the straps 16 and in overlying relation to the adjacent portions of the web 10 comprising an elongate U-shaped hairpin type terminal wire 18 having the curved end thereof 20 extending beyond one edge of the strip 10 and the open ends thereof extending beyond the other edge of the strip 10 predeformed into crossed compression relationship as indicated at 22. Apparatus for effecting the insertion of the terminal wires in the terminal wire subassembly receiving channels, and for effecting the deformation of the extending ends thereof as well as a more detailed description of the web mounted terminal wire subassemblies as so constituted are set forth in my copending divisional applications Serial Nos. 799,179 and 799,379, filed March 13, 1959.

FIGURES 2 through 4 illustrate, by way of example, the essentials of the presently preferred mechanical elements incorporating the principles of the invention that are includable in an operating station adapted, in the above mentioned production line method of capacitor manufacture, to automatically effect the insertion of previously prepared ceramic capacitor discs having metallic conducting layers on the opposite faces thereof intermediate the previously described deformed ends of the web mounted terminal wire subassemblies.

Referring to the above identified drawings, there is provided a stationary die block 24 having a pair of pilot pin receiving bores, 26, 28 disposed therein and spaced apart a distance equal to that between two successive pilot pin perforations 12 in the web 10. As best shown in FIGURE 3, the surface of the die block 24 is sloped downwardly from the bore 26, 28 transversely of the strip, so as to facilitate a twisting displacement of the web mounted terminal wire subassemblies in the necessary separation of the crossed ends thereof. Positioned above the stationary die block 24 is a vertically reciprocable pressure pad 30 having a pair of dependent pilot pins 32, 34 mounted therein in such manner as to be received by the pilot pin receiving bores 26, 28 upon downward displacement thereof. Disposed to one side of the advancing web 10 and positioned to engage the extending rounded end portions of the web mounted subassemblies is a twisting screw 36. The twisting screw 36 is provided with a horizontally disposed slot 38 into which the extending rounded ends 20 of the web mounted subassemblies 18 are advanced by the advancing web 10. The twisting screw 36 is rotated through a predetermined angular displacement by the bevel gears 40, 42 and a rocker arm assembly 44.

Operatively associated with the terminal wire subassembly twisting mechanism as described above is an assembly to separate the crossed ends 22 that extend beyond the other edge of the web 10. There is provided a dependent toothed terminal wire separating finger 46 mounted on the vertically reciprocable pressure pad 30 and positioned to engage the lower extending terminal wire adjacent the bent end thereof and to depress the same a predetermined amount at the limit of downward displacement of said pressure pad 30. Cooperatively associated therewith is a pivotally mounted wire separating finger 48 adapted to be pivotally displaced upwardly against the underside of the upper crossed terminal wire adjacent the bent end thereof by downward displacement of dependent actuating arm 50 mounted on the vertically reciprocable pressure pad 30. The wire separating fingers 46 and 48 cooperate upon downward displacement of the pressure pad 30 to separate the crossed ends 22 of the web terminal wire subassembly positioned intermediate the dependent pilot pins 32 and 34.

Insertion of the ceramic disc capacitor units intermediate the separated crossed ends of the web mounted terminal wire subassembly is effected by a horizontally disposed reciprocable slide 52. The end thereof is provided with a recessed ceramic disc containing sector 54 preferably shaped as illustrated in FIGURE 2. The depth of the recessed sector 54 should be equal to or slightly less than the thickness of the ceramic disc capacitor units being handled. The slide 52 is positioned so that the recessed sector 54 at the end thereof is disposed beneath a vertically disposed ceramic disc supply tube 56 when said slide is at the limit of its retracted position. So positioned the lowermost capacitor disc 58 in the supply tube will drop into and be contained within the sector 54 at the limit of retraction of the slide 52. Advance of the slide member 52 will result in advance of the disc 58 into position intermediate the separated crossed ends of the web mounted terminal wire subassembly.

In operation of the above described unit, the web 10 of dispensable conveyor material having deformed terminal wire subassemblies, such as illustrated in FIGURE 1, mounted thereon is advanced into operative position above the stationary die block 24 by the action of a suitable web drive mechanism. Web advance introduces the extended round end portion 20 of the terminal wire subassembly into the slot 38 in the twisting screw 36. After cessation of web advance, initial downward displacement of the pressure pad 30 results in engagement of the pilot pin perforations 12 in the web material 10 by the descending dependent pilot pins 32, 34 and in any required minor corrective adjustment of the positioning of the conveyor web 10 and terminal assembly mounted thereon relative to the manipulating elements as above described. Coincidental with the downward displacement of the pressure pad 30 rotation of the twisting screw 36 is commenced.

Continuing downward displacement of the pressure pad 30 results in engagement and downward displacement of the extending end of the terminal wire subassembly by the separating finger 46 and in engagement and upward displacement of the extending end of the terminal wire subassembly by the pivotally mounted separating finger 48. The positive displacement of the extending ends of the web mounted terminal wire subassemblies by the separating fingers 46, 48 in conjunction with the twisting thereof as effected by the screw 36 results in a predetermined separation of the crossed ends of the terminal subassembly to permit receipt therebetween of a ceramic capacitor disc 58.

With the crossed ends of the terminal wire so separated, the insertion slide 52 is advanced to position the ceramic disc capacitor unit 58 disposed in the sector 54 at the end thereof intermediate said separated crossed ends. After advance of the insertion slide 52 to effect the desired positioning of a ceramic disc capacitor unit intermediate the opened crossed ends of the web mounted terminal wire subassembly, the twisting screw 36 is returned to its rest position and coincidentally therewith the pressure pad 30 is upwardly displaced. The upward displacement of the pressure pad 30 and the return of the twisting screw 36 to its rest position results in a permitted closure of the separated ends of the web mounted terminal wire subassembly into engagement with the surfaces of the ceramic capacitor disc positioned therebetween. After the advanced ceramic disc is grasped by the crossed ends of the web mounted terminal wire subassembly, the ceramic disc feed slide 52 is retracted to its rest position, at which time the lowermost disc disposed in the supply tube 56 will be received within the sector 54 at the end of the slide.

At the conclusion of the above series of operations, a capacitor subassembly consisting of a ceramic disc type of capacitor unit compressively disposed intermediate the deformed crossed ends of the web mounted terminal wire subassembly, such as illustrated in FIGURE 5, has been formed and is ready for delivery to the next operating station includable in the above mentioned production line method of manufacture.

In the web mounted capacitor subassembly as constituted in FIGURE 5, the engagement of the wire subassembly 18 disposed within the receiving channel by the overlying retaining straps 16 and the underlying portions of the web 10 serves, in combination with the spreading of the wire subassembly occasioned by the presence of the ceramic disc intermediate the deformed end thereof, to contribute to the maintenance of a compressive force intermediate the deformed ends sufficient to permit retention of said disc therebetween without additional extrinsic fastening means. Additionally, the presence of the retained ceramic disc contributes to the desired engagement of the wire subassembly by the web 10 and aids in minimizing, if not actually preventing, undesired displacement of the wire subassembly relative to the web as might be occasioned by strip flexing and bending encountered during its advance.

Having thus described my invention, I claim:

1. In a ceramic disc capacitor fabricating machine of the class wherein an advancing web of dispensable material serves as a carrier for the capacitor unit constituent elements and progressively formed subassemblies thereof during the sequential stages of the fabrication process, apparatus for effecting the insertion of prepared ceramic capacitor discs intermediate the extending deformed ends of a web mounted terminal wire subassembly comprising a stationary die block, a vertically reciprocable pressure pad arranged to compressively position the web material against the surface of said stationary die block, means for separating the extending deformed ends of said web mounted terminal wire subassembly, means for advancing a ceramic disc capacitor unit intermediate said separated deformed ends of said web mounted terminal wire subassembly and cyclically operable means for deactivating said separating means to permit the deformed ends of said web mounted terminal wire subassembly to compressively engage said advanced ceramic disc positioned therebetween.

2. In a ceramic disc capacitor fabricating machine of the class wherein an advancing web of dispensable material serves as a carrier for the capacitor unit constituent elements and progressively formed subassemblies thereof during the sequential stages of the fabrication process, apparatus for effecting the insertion of prepared ceramic capacitor discs intermediate the extending deformed ends of a web mounted terminal wire subassembly comprising means for positioning the web material against displacement thereof, means for separating the extending deformed ends of said web mounted terminal wire subassembly, means for advancing a ceramic disc capacitor unit intermediate said separated deformed ends of said web mounted terminal wire subassembly and cyclically operable means for deactivating said separating means to permit the deformed ends of said web mounted terminal wire subassembly to compressively engage said advanced ceramic disc positioned therebetween.

3. In a ceramic disc capacitor fabricating machine of the class wherein an advancing web of dispensable material serves as a carrier for the capacitor unit constituent elements and progressively formed subassemblies thereof during the sequential stages of the fabrication process, apparatus for effecting the insertion of prepared ceramic capacitor discs intermediate the extending deformed ends of a web mounted terminal wire subassembly comprising a stationary die block, a vertically reciprocable pressure pad arranged to compressively position the web material against the surface of said stationary die block, means engageable with said terminal wire subassembly remote from the extending deformed ends thereof for twisting selectively the same relative to said web to urge said extending deformed ends into separated relation, means engageable with said terminal wire subassembly adjacent the extending deformed ends thereof and cooperable with said twisting means for separating the extending deformed ends of said web mounted terminal wire subassembly, means for advancing a ceramic disc capacitor unit from a supply thereof intermediate said separated deformed ends of said web mounted terminal wire subassembly and cyclically operable means for deactivating said separating means to permit the deformed ends of said web mounted terminal wire subassembly to compressively engage said advanced ceramic disc positioned therebetween.

4. In a ceramic disc capacitor fabricating machine of the class wherein an advancing web of dispensable material serves as a carrier for the capacitor unit constituent elements and progressively formed subassemblies thereof during the sequential stages of the fabrication process, apparatus for effecting the insertion of prepared ceramic capacitor discs intermediate the extending deformed ends of a web mounted terminal wire subassembly comprising means for fixedly locating said web of carrier material, means disposed adjacent said locating means and engageable with a terminal wire subassembly mounted on said carrier for displacing the extending deformed ends thereof to a separated condition, means for advancing a ceramic disc capacitor unit from a supply thereof intermediate the separated deformed ends of said web mounted terminal wire subassembly and cyclically operable means for deactivating said separating means to permit the separated deformed ends of said web mounted terminal wire subassembly to be displaced in compressive engagement with the advanced ceramic disc positioned therebetween.

5. In a ceramic disc capacitor fabricating machine operable upon a strip of dispensable material which serves as a carrier for capacitor unit constituent elements and progressively formed subassemblies thereof during the sequential stages of the fabrication process, apparatus for effecting the insertion of prepared ceramic capacitor discs intermediate the extending deformed ends of a strip mounted terminal wire subassembly comprising means for fixedly locating said strip of carrier material, means engageable with a terminal wire subassembly mounted on said carrier adjacent the extending deformed ends thereof for displacing said extending deformed ends to a separated condition, means for advancing a ceramic disc capacitor unit from a supply thereof intermediate the separated deformed ends of said strip mounted terminal wire subassembly and sequenced means operable subsequent to advance of said capacitor unit intermediate said separated deformed ends of said strip mounted terminal wire subassembly for deactivating said separating means to permit the separated deformed ends of said strip mounted terminal wire subassembly to be displaced into compressive engagement with the advanced ceramic disc positioned therebetween.

6. In a ceramic disc capacitor fabricating machine operable upon a strip of dispensable material which serves as a carrier for capacitor unit constituent elements and progressively formed subassemblies thereof during the sequential stages of the fabrication process, apparatus for effecting the insertion of prepared ceramic capacitor discs intermediate the extending deformed ends of a strip mounted terminal wire subassembly of the U-shaped hairpin type that includes elongated generally parallel portions interconnected by an end portion remote from said deformed ends, said apparatus comprising means for fixedly locating said strip of carrier material, means engageable with a terminal wire subassembly mounted on said carrier for displacing said extending deformed ends to a separated condition, said last-named means including a slotted twisting device engageable with the end portion of a terminal wire subassembly mounted on said carrier and means for rotating said twisting device through a predetermined angle, means for advancing a ceramic disc capacitor unit from a supply thereof intermediate the separated deformed ends of said strip mounted terminal wire subassembly, and sequenced means operable subsequent to advance of said capacitor unit intermediate said separated deformed ends of said strip mounted terminal wire subassembly for reversely operating said displacing means and thereby causing the separated deformed ends of said strip mounted terminal wire subassembly to be displaced into compressive engagement with the advanced ceramic disc positioned therebetween.

7. In a ceramic disc capacitor fabricating machine of the class wherein an advancing web of dispensable material serves as a carrier for the capacitor unit constituent elements and progressively formed subassemblies thereof during the sequential stages of the fabrication process, apparatus for effecting the insertion of prepared ceramic capacitor discs intermediate the extending deformed ends of a web mounted terminal wire subassembly comprising means for fixedly locating said web of carrier material, means disposed adjacent said locating means and engageable with a terminal wire subassembly mounted on said carrier for displacing the extending deformed ends thereof to a separated condition, means for advancing a ceramic disc capacitor unit from a supply thereof intermediate the separated deformed ends of said web mounted terminal wire subassembly and cyclically operable means for returning said separating means to its condition that prevailed prior to engagement with the terminal wire subassembly and thereby causing the separated deformed ends of said web mounted terminal wire subassembly to be displaced in compressive engagement with the advanced ceramic disc positioned therebetween.

References Cited in the file of this patent

UNITED STATES PATENTS

| | | |
|---|---|---|
| 2,333,966 | Weiss | Nov. 9, 1943 |
| 2,390,784 | Drobish et al. | Dec. 11, 1945 |
| 2,757,792 | Shioleno | Aug. 7, 1956 |
| 2,766,510 | Heibel | Oct. 16, 1956 |
| 2,830,698 | Coda | Apr. 15, 1958 |
| 2,929,130 | Packman | Mar. 22, 1960 |